United States Patent
Gupta et al.

(10) Patent No.: US 8,370,208 B1
(45) Date of Patent: *Feb. 5, 2013

(54) DETERMINING WHETHER TO INCLUDE ITEMS IN A DATA FEED

(75) Inventors: Mohit Gupta, Bellevue, WA (US); Bin Xu, Issaquah, WA (US); Jiaming (Jason) Sun, Bellevue, WA (US); Nagender Parimi, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 108 days.

This patent is subject to a terminal disclaimer.

(21) Appl. No.: 12/705,692

(22) Filed: Feb. 15, 2010

(51) Int. Cl.
*G06Q 30/00* (2012.01)
(52) U.S. Cl. ................................... 705/26.1
(58) Field of Classification Search ........... 705/26.1, 705/26.2, 26.25, 26.3, 26.35, 26.4, 26.41–26.44, 705/26.5, 26.61–26.64, 26.7, 26.8, 26.81, 705/26.82, 26.9, 27.1, 27.2
See application file for complete search history.

(56) References Cited

U.S. PATENT DOCUMENTS

| | | | | |
|---|---|---|---|---|
| 5,299,115 | A * | 3/1994 | Fields et al. | 705/7.22 |
| 6,029,141 | A * | 2/2000 | Bezos et al. | 705/27.1 |
| 6,629,135 | B1 * | 9/2003 | Ross et al. | 709/218 |
| 7,039,599 | B2 * | 5/2006 | Merriman et al. | 705/14.52 |
| 7,249,056 | B1 * | 7/2007 | Crouthamel et al. | 705/26.41 |
| 7,725,456 | B2 * | 5/2010 | Augustine | 707/713 |
| 2002/0077930 | A1 * | 6/2002 | Trubey et al. | 705/26 |
| 2002/0082923 | A1 * | 6/2002 | Merriman et al. | 705/14 |
| 2005/0137887 | A1 * | 6/2005 | Porter et al. | 705/1 |
| 2006/0089880 | A1 * | 4/2006 | Merriman et al. | 705/14 |
| 2007/0204308 | A1 * | 8/2007 | Nicholas et al. | 725/86 |
| 2008/0270481 | A1 * | 10/2008 | Augustine | 707/200 |
| 2011/0178890 | A1 * | 7/2011 | Ravichandran et al. | 705/26.1 |

OTHER PUBLICATIONS

Villano, Matt "Interland Rewards Affiliates for Referrals", CRN n1082 pp. 37, Feb. 9, 2004. Retreived from Dialog File: 15, Acc#: 02689586.*
No Author, "MGIC Announces its Customer Relationship Management (CRM) Strategies.", PR Newswire, p. 0538, Sep. 2, 1999. Retrieved from Dialog File: 621, Acc#: 02162192.*
Breiman, L., "Random Forests," Machine Learning, vol. 45, 2001, pp. 5-32, Kluwer Academic Publishers, The Netherlands.
Breiman, L., et al., "Regression Trees," Classification and Regression Trees, Jan. 1, 1984, 216-265, Chapman & Hall, 1st edition, USA.
Freidman, J.H., "Greedy Function Approximation: A Gradient Boosting Machine," Annals of Statistics, vol. 29, Feb. 1999, pp. 1189-1232, Stanford University, Stanford, California.
Freidman, J.H., "Multivariate Adaptive Regression Splines," Annals of Statistics, vol. 19, Mar. 1991, pp. 1-67, Stanford University, Stanford, California.
Vapnik, V., Golowich, S.E., and Smola, A., "Support Vector Method for Function Approximation, Regression Estimation, and Signal Processing," Advances in Neural Information Processing Systems, vol. 9, 1997, pp. 281-287, MIT Press, Cambridge, Massachusetts.

* cited by examiner

*Primary Examiner* — Naeem Haq
(74) *Attorney, Agent, or Firm* — Thomas |Horstemeyer, LLP (57) ABSTRACT

This disclosure relates to determining whether to include items in a feed to a referral network site. A catalog is maintained of a plurality of items sold through an electronic commerce network site, wherein at least a portion of a plurality of sales of the items originate by virtue of a referral from a referral network site. A quantity of commercial data associated with the items is stored in a data store, and a predictive model is trained with the commercial data associated with the items. Each of the items is applied to the predictive model to determine whether such items are to be included in a feed to the referral network site. The feed that includes a subset of the items is sent to the referral network site.

27 Claims, 5 Drawing Sheets

DETERMINING WHETHER TO INCLUDE ITEMS IN A DATA FEED

BACKGROUND

For merchants that sell products on the Internet, it can be useful to have other network sites help drive traffic to the network site of the merchant in order to increase sales. Such other network sites may be paid a referral fee or other fee by the merchant for each customer that is directed to the network site of the merchant. Such other network sites may comprise comparison shopping sites that compare the prices of multiple merchants for various items.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
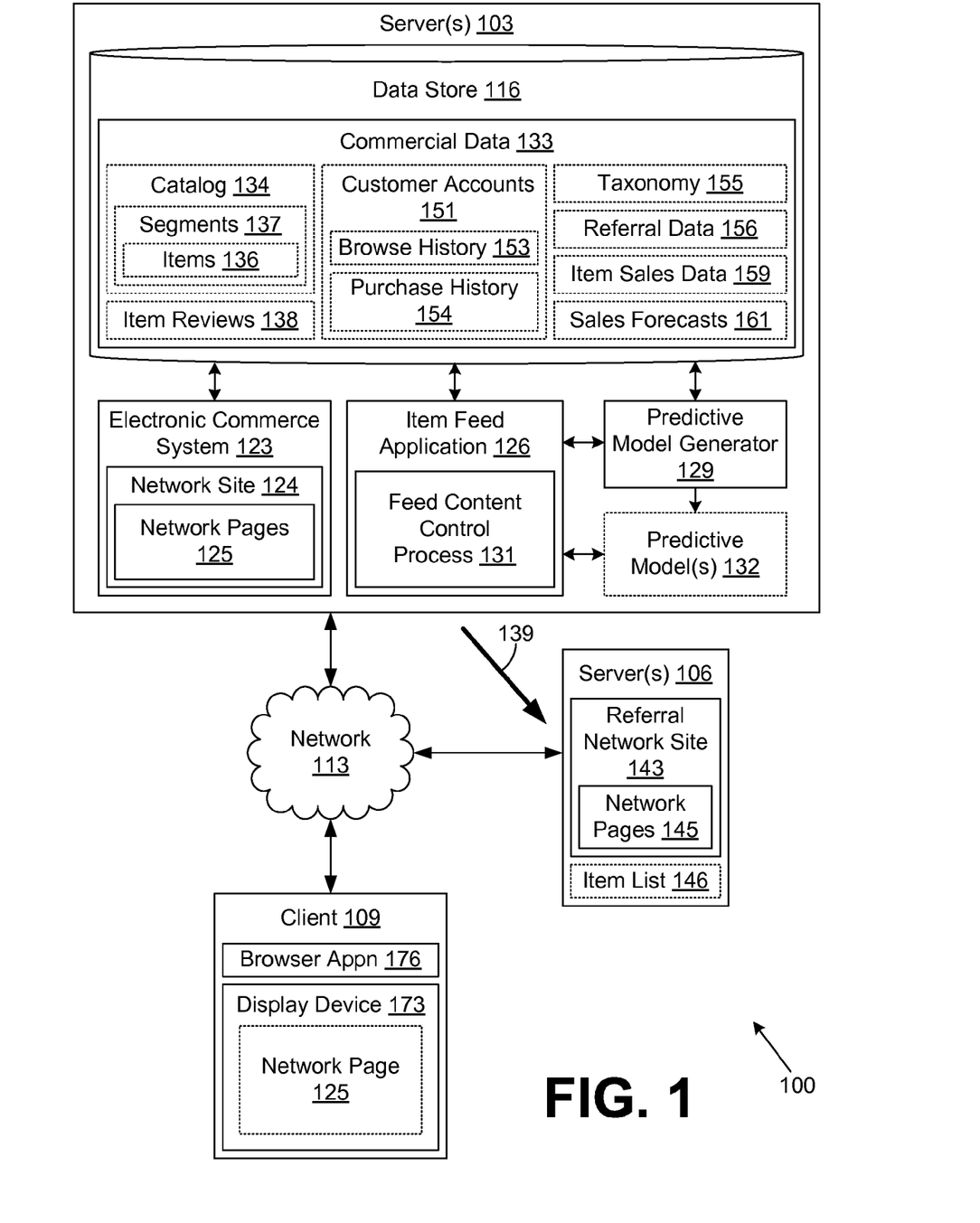
FIG. 1 is a drawing of a networked environment that includes servers and a client according to an embodiment of the present disclosure.

With reference to FIG. 1, the following relates to the transmission of data to a network site such as a comparison shopping site in a networked environment 100 in association with the activities of a merchant that sells goods and/or services online over a network such as the Internet or other network. In the following discussion, first a description of the physical nature of the networked environment 100 is provided, followed by a description of the operation of the same. A more detailed discussion of various aspects is provided with respect to later figures.

The networked environment 100 depicted in FIG. 1 includes various computing devices such as, for example, one or more servers 103, one or more servers 106, one or more clients 109, and/or other computing devices that are coupled to a network 113. The network 113 may comprise, for example, the Internet, intranets, extranets, wide area networks (WANs), local area networks (LANs), wired networks, wireless networks, or other suitable networks, etc., or any combination of two or more such networks. For purposes of convenience, each of the servers 103, 106 and the client 109 are referred to herein in the singular. However, it is understood that in one embodiment, each of the servers 103, 106 may represent a plurality of servers. Also, the client 109 may represent a plurality of clients.

Each of the servers 103 and/or 106 comprises one example of a computing device that may be employed to execute various components as described herein. Each of the servers 103 and/or 106 may comprise, for example, a server computer or like system, and may represent multiple servers arranged, for example, in one or more server banks or other arrangements. Such servers may be located in a single installation or may be dispersed among many different geographical locations. To this end, each of the servers 103 and/or 106 may be viewed as a server "cloud" that represents the computing capacity of multiple servers, etc.

Various applications and/or systems are executed in the server 103 according to various embodiments. Also, various data may be stored in a data store 116 that is accessible to the server 103. The data stored in the data store 116, for example, may be associated with the operation of the various systems, applications, and/or processes described below. The systems and applications executed in the server 103 may include, for example, an electronic commerce system 123, an item feed application 126, a predictive model generator 129, and potentially other systems and applications. Among other functions, the electronic commerce system 123 implements a network site 124 on the network 113 as will be described. The item feed application 126 includes a feed content control process 131 as will be described. Also, the predictive model generator 129 generates a predictive model 132 as will be described. In addition, other systems, applications, and/or processes may be implemented in the server 103 that are not discussed in detail herein.

The electronic commerce system 123 is configured to conduct electronic commerce to facilitate the network presence of one or more online merchants through the network site 124. Thus, the electronic commerce system 123 operates one or more network sites 124 such as web sites on the Internet that facilitate electronic commerce. The electronic commerce system 123 may comprise many different applications, components, and/or systems implemented on a plurality of computing devices such as the server 103 that are located at one site, or are distributed among geographically diverse sites as can be appreciated.

The applications and/or components that make up the electronic commerce system 123 provide for various functions to facilitate electronic commerce. Such functions involve storage, access, and editing of commercial data 133 stored in the data store 116. Such commercial data 133 may include a catalog 134 in which is stored data describing a plurality of items 136 such as products sold to customers by an online merchant. The data describing each of the items 136 may include item images, pricing, and other information. The items 136 sold through the electronic commerce system 123 may comprise, for example, goods and/or services. Each of the items 136 is associated with a given segment 137. Each segment 137 may be defined by market segments, product segments, or other appropriate approach taken to categorize items 136. In one embodiment, a predictive model 132 is generated for each segment 137 of items 136. The items 136 in a given segment 137 may have features or subject matter in common with each other. For example, a given product segment 137 may include various types of bicycles, etc. Alternatively, a given product segment 137 may specify items 136 related to a sport such as baseball, football, or soccer, etc.

In addition, item reviews 138 may be associated with each of the items 136. Such item reviews 138 may be generated from customers or other entities. The item reviews 138 may comprise star ratings or other types of reviews. In addition, the item reviews 138 may include text from the individual describing the personal experience of customers with respect to their purchase of an item 136.

The electronic commerce system 123 may also facilitate various functions associated with the operation of the network site 124 such as, for example, generating network pages 125 that provide for searching for items 136 and presenting search results for such items 136. Such network pages 125 may also present detailed information about items 136 and may facilitate the purchase of items 136 by providing for payment for items 136 and facilitating other functions. Thus, in providing for the purchase of items 136, the electronic commerce system 123 implements one or more network sites 124 that generate a plurality of different network pages 125 such as web pages or other network content that is served up to various clients 109 controlled by customers. Such network pages 125 may be static and/or created dynamically.

The item feed application 126 is executed in the server 103 in order to generate a feed 139 that comprises a listing of the items 136 that is sent to a referral network site 143 implemented on the server 106. The referral network site 143 functions to refer clients 109 to the network site 124 and other sites as will be described. The referral network site 143 generates and serves up network pages 145 to clients 109 as will be described. The information included in the feed 139 is stored in association with the operation of the referral network site 143 as item list 146.

The commercial data 133 may track the occurrences of various events that occur during the normal operation of the electronic commerce system 123. The commercial data 133 may comprise, for example, customer accounts 151 that include browse histories 153, purchase histories 154, and other customer data that describes the customer. Such data may include payment addresses, delivery addresses, payment instruments, and other data used to consummate various commercial transactions. Each of the browse histories 153 tracks various events inherent in the navigation of customers through various network pages 125 of the network site 124. Such events may comprise, for example, how many times customers have clicked on or otherwise selected or viewed specific items 136 in a detail network page 125, etc. Each purchase history 154 tracks various events such as the items 136 purchased by customers over time.

The commercial data 133 may further include a taxonomy 155 that may be employed by customers to narrow their searches for specific items 136 among those sold through the network site 124. Such a taxonomy 155 includes a plurality of categories at various levels that may be selected by customers to identify one of the items 136 they wish to purchase.

Also stored in the data store 116 as part of the commercial data 133 are referral data 156, pricing data 157, item sales data 159, item sales forecasts 161, and potentially other data. The referral data 156 includes data that tracks when a client 109 has requested a network page 125 from the network site 124 based upon a referral from the referral network site 143 as will be described. The pricing data 157 includes current and historical prices of items 136 sold through the electronic commerce system 123. The item sales data 159 tracks the number of each of the items 136 that are sold over time through the electronic commerce system 123 as well as other information about the sales of items 136. The item sales data 159 also indicates whether the sale of a given item 136 occurred as the result of a referral from a given referral network site 143. The item sales forecasts 161 involve forecasts for the expected sales of items 136 based on various data such as item sales data 159. The various data stored in the data store 116 may be stored or accessed by the electronic commerce system 123, the item feed application 126, the predictive model generator 129, or other applications and systems as can be appreciated.

As mentioned above, the server 106 is employed to implement the referral network site 143. In one embodiment, the referral network site 143 provides for comparison shopping and is configured to generate and serve up network pages 145 that include listings of multiple offerings for various items 136 from multiple different merchants as will be described. The item list 146 includes information about each of the items 136 included in the feed 139 sent to the referral network site 143. Such information may include all or a portion of the information contained about such items 136 in the catalog 134.

The client 109 is representative of a plurality of client devices that may be coupled to the network 113. For example, the client 109 may comprise one of millions of clients 109 coupled to the Internet. The client 109 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability.

The client 109 may include, for example, various peripheral devices. In particular, the peripheral devices may include input devices such as, for example, a keyboard, keypad, touch pad, touch screen, microphone, scanner, mouse, joystick, or one or more push buttons, etc. The peripheral devices may also include a display device 173, indicator lights, speakers, etc. The display device 173 may comprise, for example, cathode ray tubes (CRTs), liquid crystal display (LCD) screens, gas plasma-based flat panel displays, LCD projectors, or other types of display devices, etc.

Executed within the client 109 are various applications including a browser application 176. The client browser application 176 is configured to interact with the network site 124 implemented by the electronic commerce system 123 and potentially other applications on the server 103 according to an appropriate protocol such as the Internet Protocol Suite comprising Transmission Control Protocol/Internet Protocol (TCP/IP) or other protocols. To this end, the browser application 176 may comprise, for example, a commercially available browser such as INTERNET EXPLORER® sold by Microsoft Corporation of Redmond, Wash., or MOZILLA FIREFOX® which is promulgated by Mozilla Corporation of Mountain View, Calif., or other type of browser. Alternatively, the browser application 176 may comprise some other type of interface application with like capability. When executed in the client 109, the browser application 176 is configured to render network pages 125/145 such as, for example, web pages and the like on the display device 173 and to perform other functions. Also, the browser application 176 may implement the execution of active portions of the network pages 125/145 as can be appreciated.

Next, a general description of the operation of the various components described above in the networked environment 100 is provided. The electronic commerce system 123 is configured to conduct electronic commerce with various customers through clients 109 over the network 113 as described above. To this end, the electronic commerce system 123 implements a network site 124 through which items 136 are sold to customers as can be appreciated. Such items 136 are stored in the catalog 134 as described above. In conducting electronic commerce with various clients 109, the electronic commerce system 123 may serve up various network pages 125 that serve various purposes as mentioned above.

In one embodiment, as mentioned above, the referral network site 143 implemented on the server 106 refers customers to the network site 124 associated with the electronic commerce system 123 to potentially consummate a purchase of an item 136.

Figure 2:
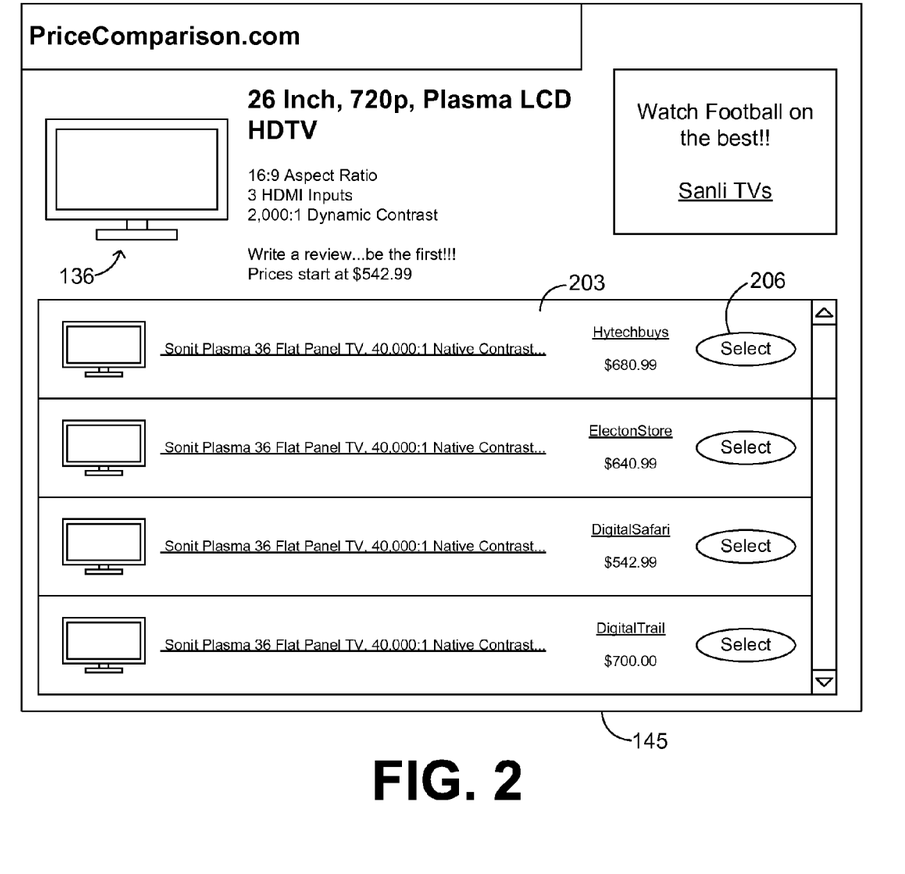
FIG. 2 is a drawing of a network page generated by a network site hosted on one of the servers in the networked environment of FIG. 1 according to an embodiment of the present disclosure.

To explain further, reference is made to FIG. 2, in which one example is shown of a network page 145 generated by the referral network site 143 (FIG. 1). The network page 145 is one example of many different network pages 145 generated by the referral network site 143, where the referral network site 143 provides for price comparison shopping. Examples of such price comparison sites include, for example, www-.shopzilla.com, www.shopping.com, and other such sites. To this end, the network page 145 displays an item 136 along with a basic description of the item 136. A more detailed description of the item 136 may also be displayed, or links, tabs, or other connections to a more detailed explanation may be included, etc.

In addition, the network page 145 displays a number of merchant offerings 203 for the respective item 136. To this end, a user is able to specify a given item 136 that they wish to purchase on the referral network site 143 by performing a product search, by navigating through a taxonomy 155 (FIG. 1), or by some other approach. The user may then cause the referral network site 143 to generate the network page 145 that sets forth the merchant offerings 203 for the respective item 136. The user can then compare the various merchant offerings 203 for the item 136 and select the offer they favor the most.

Associated with each merchant offering 203 is a link 206 that directs the customer to a respective site of a corresponding merchant. One of the links 206 directs the customer to the network site 124 (FIG. 1) of a merchant that is implemented by the electronic commerce system 123 (FIG. 1) described above. Each of the links 206 may be embodied in the form of a "select" button or other component as can be appreciated. If a user wishes to pursue a purchase of the item 136 based on a respective merchant offering 203, then the user may click on the respective button or other component associated with such merchant offering 203 to be referred to the merchant network site 124.

Referring back to FIG. 1, upon manipulating the link 206, the user is referred to a network page 125 (FIG. 1) generated by the network site 124 that comprises, for example, a detail page presenting the respective item 136 with the ability to place such item 136 into a shopping cart and proceed to checkout in order to purchase such item 136 or take other action. In order to cause the network site 124 to generate the respective network page 125 that comprises a detail page presenting the respective item 136 viewed in the network page 145, the link 206 causes a browser application 176 (FIG. 1) to generate a request for the specific network page 125 that comprises the detail page presenting the item 136 as can be appreciated.

Such a request includes information indicating that the request is based upon a referral from the respective referral network site 143. The electronic commerce system 123 is configured to store all of the referrals received from referral network sites 143 for each of the items 136 in the referral data 156 (FIG. 1). Thus, over time, the electronic commerce system 123 will store all of the referrals received from referral network sites 143 in the data store 116 (FIG. 1) for future reference in determining whether items 136 are to be included in the feed 139 (FIG. 1) as will be described.

In some situations, there may be a commercial relationship established between the operator of a referral network site 143 and a merchant associated with a network site 124 implemented by the electronic commerce system 123. For example, the merchant may pay the operator of a referral network site 143 a predefined fee for each referral received. Alternatively, the merchant and the operator of the referral network site 143 may agree that the merchant is to pay the operator a predefined percentage of the sales price for all items 136 sold based upon a referral received from the referral network site 143.

In this respect, the parties may establish a mutually beneficial relationship such that the merchant receives the benefit of extra traffic driven to the network site 124, and the operator of the referral network site 143 receives the benefit of having more items 136 to list and more merchant offerings 203 (FIG. 2) to show in various comparisons for various items 136 as described above. In addition, there may be other terms specified between the parties for the referral activity.

A number of referrals may be tracked in both the server 103 by the respective merchant and in the server 106 by the respective operator of the referral network site 143 so that precise amounts owed based upon referrals as described above can be determined. Similarly, the number of sales based upon a referral may be maintained in the server 103 in the item sales data 159 (FIG. 1) so that appropriate amounts may be calculated to pay to the operator of the referral network site 143 as can be appreciated.

In order to provide the operator of the referral network site 143 with the information needed to present the merchant offering 203 with respect to items 136, the item feed application 126 (FIG. 1) is executed in the server 103 in order to generate the feed 139 that includes a subset of the total number of items 136 stored in the catalog 134 (FIG. 1). The feed 139 includes a listing of a subset of all of the items 136 contained in the catalog 134 that have been selected or otherwise designated to send to the referral network site 143. The information contained in the feed 139 for each of the items 136 included therein may comprise selected details about such items 136 including item images, product descriptions, product feedback ratings, and other information as can be appreciated.

The feed 139 may be sent from the item feed application 126 to the referral network site 143 periodically in such a manner so as to maintain the most up-to-date item list 146 (FIG. 1) in the referral network site 143. For example, the feed 139 may be sent weekly, daily, every few hours, or at any other appropriate time interval as can be appreciated. In one embodiment, the feed 139 may include a description of all items 136 included therein in a complete listing. In other embodiments, the feed 139 may include only such information that has changed relative to a prior sent feed 139. For example, such information may include any changed prices, or other aspects of the items 136 that have been sent to the referral network site 143 in a prior feed 139.

The feed content control process 131 (FIG. 1) is executed as a portion of the item feed application 126 in order to determine whether individual items 136 are to be included in the feed 139. The feed content control process 131 may include multiple different routines that are executed depending upon a desired configuration as will be described. In one embodiment, the feed content control process 131 ultimately generates a list of items 136 from the catalog 134 that are to be included in the feed 139 that is sent to the referral network site 143.

In one embodiment, the feed content control process 131 may implement various routines to determine whether various items 136 are to be included in a feed 139. Such routines may specify a progression of rules that are applied to respective items 136 based upon past sales performance and other factors as will be described.

In another embodiment, the predictive model generator 129 is configured to generate predictive models 132 (FIG. 1) at predefined times. For example, the predictive models 132 may be generated automatically in accordance with a predefined schedule. Each predictive model 132 may be generated, for example, periodically at predefined time intervals such as monthly, weekly, daily, hourly, or other time interval. The predictive models 132 (FIG. 1) are used to determine whether items 136 should be included in a feed 139. The predictive model generator 129 generates each predictive model 132 based upon the commercial data 133 (FIG. 1) associated with the items 136 stored in the data store 116 that fall into a given item segment 137 (FIG. 1). In one embodiment, greater weight may be applied to the consideration of the referral data 156 and the item sales data 159 when training a predictive model 132, although various combinations of the various types of commercial data 133 may be employed. As mentioned above, such an item segment 137 may comprise, for example, a market segment, product segment, or other item grouping.

In one embodiment, the predictive model 132 comprises a random forest model or other type of predictive model. Such a random forest model is described by Breiman, Leo, *Random Forests*, Machine Learning, Kluwer Academic Publishers, vol. 45, pp. 5-32, 2001, which is incorporated herein in its entirety. Alternatively, other regression methods may also be employed to provide for a predictive model 132 as described by Breiman, Leo, et al., *Classification and Regression Trees*, Chapter 8, "Regression Trees," Chapman & Hall, 1$^{st}$ edition, pp. 216-265, Jan. 1, 1984, and Freidman, J. H., *Multivariate Adaptive Regression Splines*, Annals of Statistics, vol. 19, p. 1 (1991), each of which is incorporated herein in its entirety. Further references that discuss regression methods that may be employed include Friedman, J. H., *Greedy Function Approximation: A Gradient Boosting Machine*, Annals of Statistics, vol. 29, pp. 1189-1232 (2000); and Vapnik, V. et al., *Support Vector Method for Function Approximation, Regression Estimation, and Signal Processing*, Advances in Neural Information, Processing Systems 9 (Mozer, M. C., Jordon, M. I., and Petsche, T. editors), MIT Press, Cambridge, Mass., pp. 281-287, 1997, each of which is incorporated herein in its entirety. The predictive model 132 may comprise a regression model, a classification model, or other type of model as can be appreciated.

In one embodiment, the predictive model 132 is trained to determine the expense in terms of cost for referrals from a referral network site 143 as a percentage of the revenue received for the sale of items 136 originating by way of such referrals. For example, a given referral network site 143 may operate on a cost-per-click basis with respect to the network site 124 operated by the electronic commerce system or other network site. This means that the operator of the network site 124 pays a fee to the operator of the referral network site 143 each time a user clicks on a link in a network page 145 that directs a user to the network site 124. Alternatively, referral network site 143 may operate on a cost-per-action basis with respect to the network site 124. The "action" may comprise, for example, a sale of an item 136 or other action as agreed upon by the parties. In the case that the action comprises a sale of an item 136, the operator of the network site 124 may pay a fee comprising a percentage of the sales proceeds or other amount for an item 136 sold through the network site 124, where such sale originated due to a referral from the referral network site 143. In addition, other types of financial arrangements may be made to compensate the operator of the referral network site 143 for referrals to the network site 124.

The feed content control process 131 applies each of the items 136 belonging to a respective segment 137 to a corresponding predictive model 132 to obtain a score for each of such items 136. The application of the items 136 may also be performed automatically based on a predefined schedule. In response, the respective predictive model 132 returns a score for each of the items 136. In one embodiment, the feed content control process 131 determines whether each individual item 136 is to be included in the feed 139 in response to a comparison between the score for the respective items 136 and predefined threshold values. Ultimately, the feed content control process 131 generates a report based on the results of the application of each of the items 136 to the predictive model 132 that indicates which items 136 are to be excluded from a feed as well as parameters indicating how the predictive model 132 performed for each instance in which all of the items 136 were processed. Also, such a report may indicate other parameters.

Figure 3:
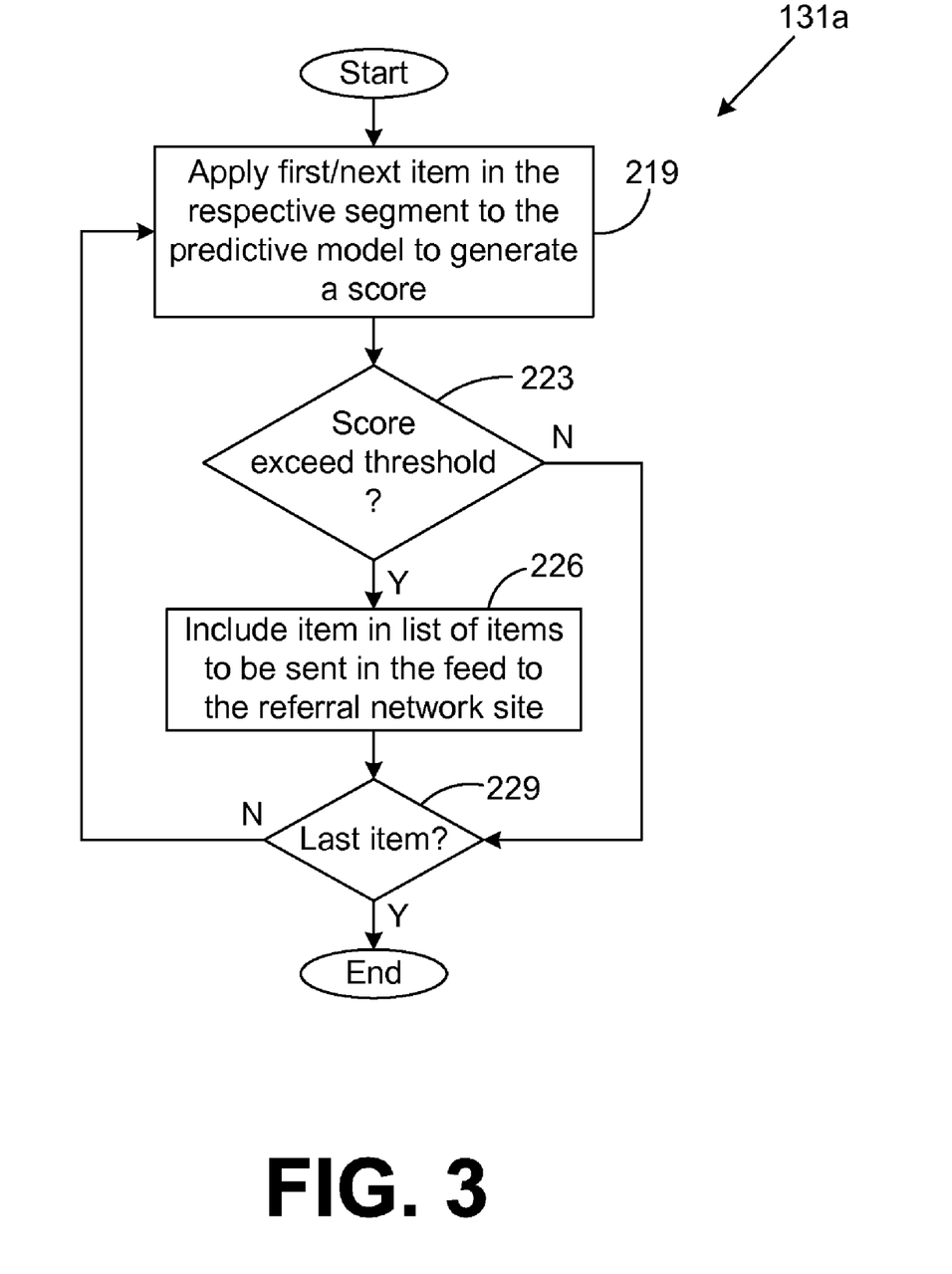
FIG. 3 is a drawing of a flowchart that illustrates example functionality of a feed content control process implemented in one of the servers in the networked environment of FIG. 1 according to an embodiment of the present disclosure.

With reference to FIG. 3, shown is a flowchart that depicts one example of functionality of the feed content control process 131 (FIG. 1), denoted here in as feed content control process 131*a*, according to various embodiments. Alternatively, the flowchart of FIG. 3 may be viewed as depicting steps of a method implemented in the server 103 (FIG. 1) or other device according to various embodiments. The functionality depicted in FIG. 3 may be implemented automatically at predefined times according to a schedule or at other specified times.

To begin, in box 219 the feed content control process 131*a* applies a given item 136 in the respective segment 137 to a corresponding predictive model 132 to generate a score for the item 136. The predictive model generator 129 generated the predictive model(s) 132 previously as mentioned above. The predictive models 132 may each comprise, for example, a random forest model. In such case, the predictive model generator 129 generates such a model by creating an instance of an untrained random forest model and then using the commercial data 133 (FIG. 1) described above to train the same, thereby generating the predictive model 132 for further use. Such commercial data 133 may be expressed as attributes associated with respective items 136. Alternatively, the predictive model generator 129 may generate the predictive model 132 using some other approach.

To train the predictive model 132, the commercial data 133 may be segmented according to predefined time periods. For example, item sales data 159 (FIG. 1) may be cordoned into separate time periods in the past such all sales that occurred within the last 1, 3, 5, 7, 14, . . . , 60 days, etc. In this manner, the relative timing of the sales or other attribute may be taken into account when training the predictive model 132. That is to say, any type of commercial data 133 that occurs over time can be categorized or segmented according to specific time periods and used to train the predictive model 132.

Next, in box 223, the feed content control process 131*a* determines whether the score determined in box 219 exceeds or otherwise moves beyond a given predefined threshold. The predefined threshold is application specific and may be determined, for example, based on experience with respect to what constitutes an acceptable or desired level of future sales for items 136.

Next, if the score exceeds or otherwise moves beyond the predefined threshold as determined in box 223, the feed content control process 131*a* proceeds to box 226. Otherwise, the feed content control process 131*a* jumps to box 229. In box 226, the current item 136 is included in a list of items 136 to be sent to the referral network site 143 (FIG. 1) in the next feed 139 (FIG. 1). Thereafter, the feed content control process 131*a* proceeds to box 229.

In box 229, the feed content control process 131*a* determines whether there are any further items 136 in the respective segment 137 to be applied to the predictive model 132. If so, then the feed content control process 131*a* reverts back to box 219 to consider the next item 136. Otherwise, this portion of the feed content control process 131*a* ends as shown.

Ultimately, this portion of the feed content control process 131*a* is repeated for each segment 137 of items 136 maintained in the catalog 134 (FIG. 1). In this manner, a subset of all of the items 136 in the catalog 134 may be included in the list of items 136 to be sent to the referral network site 143. Once this list of items 136 is complete, the item feed application 126 (FIG. 1) is configured to generate the actual feed 139 that is sent to the referral network site 143. In addition, it should be noted that the list of items 136 may indicate those items 136 that are to be excluded from the feed 139. As such, in box 223, the flow in the branches leaving box 223 may be reversed and box 226 would provide for the exclusion of an item 136 as can be appreciated.

Figure 4:
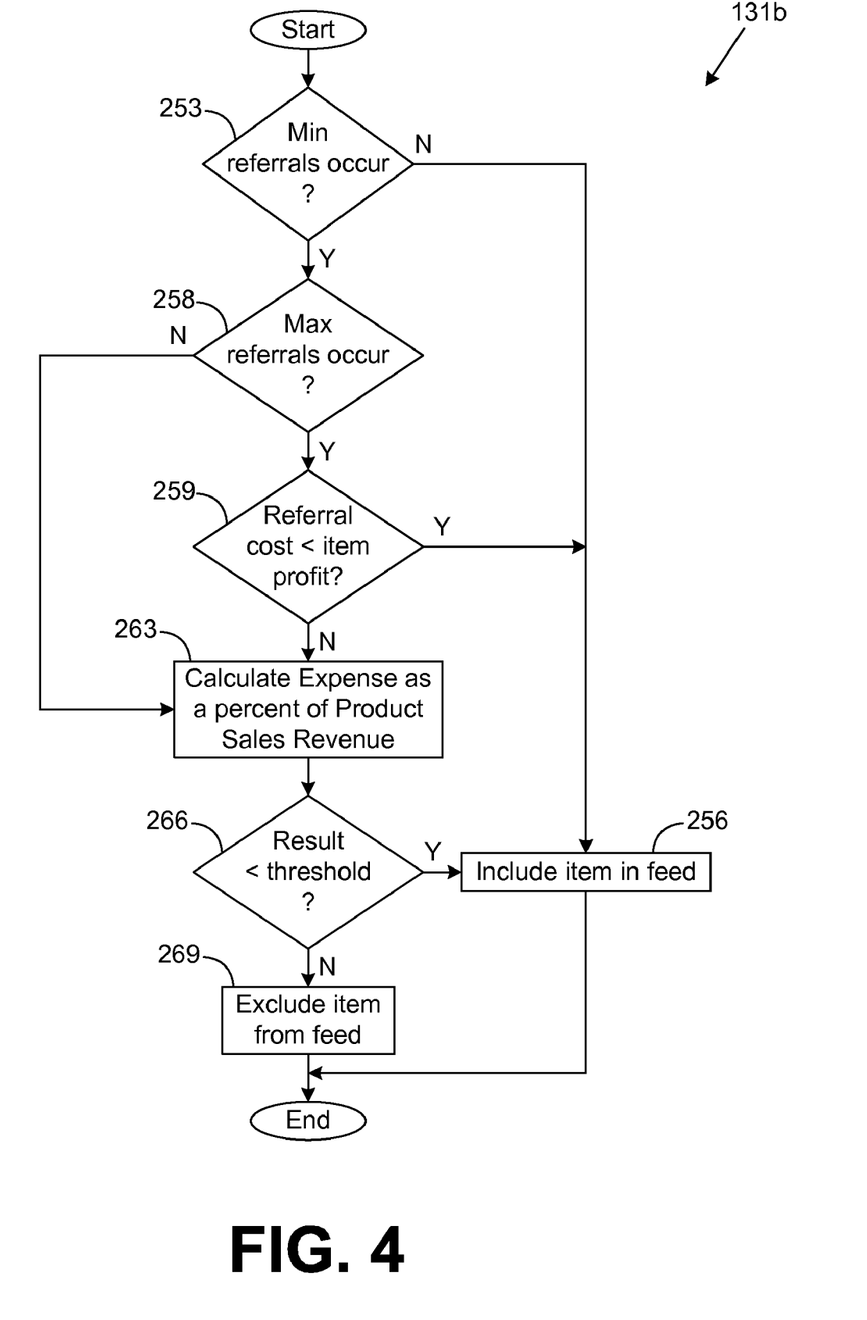
FIG. 4 is a drawing of a flowchart that illustrates additional functionality of a feed content control process implemented in one of the servers in the networked environment of FIG. 1 according to an embodiment of the present disclosure.

With reference next to FIG. 4, shown is a flowchart that illustrates another example of an exclusion process portion of the feed content control process 131 (FIG. 1), denoted herein as feed content control process 131*b*, that may be executed to determine whether given items 136 (FIG. 1) should be excluded from the feed 139 (FIG. 1) to the referral network site 143 (FIG. 1) as described above. Alternatively, the flowchart of FIG. 4 may be viewed as depicting steps of a method implemented in the server 103 (FIG. 1) according to various embodiments. The feed content control process 131*b* depicted in FIG. 4 is implemented with respect to each item 136 to determine whether such items 136 should be included in the feed 139. Essentially, the feed content control process 131*b* implements a number of rules to determine whether an item 136 is to be included in a feed 139. The process of FIG. 4 may be implemented as an alternative to the process of FIG. 3, or such processes may both be used to make the ultimate determination as to whether an item 136 is to be included in a feed 139 as will be described.

To begin, in box 253, the feed content control process 131*b* determines whether a minimum number of referrals stored as the referral data 156 (FIG. 1) for a respective item 136 has occurred over a prior predefined period of time. Such period of time may comprise, for example, a number of weeks stretching into the past from the present time. For example, the time period may comprise the last seven weeks or other number of weeks as can be appreciated. The period of time may be of any length measured in terms of years, months, weeks, days, hours, or any other period of time.

If a minimum number of referrals have not occurred for a given item 136 over the last specified period of time, then the feed content control process 131*b* proceeds to box 256 in which the item 136 is included in the item feed 139. This is because if a minimum number of referrals have not occurred, then it may be that the item 136 needs to be made available on the referral network site 143 for an additional period of time due to the fact that such item 136 is in the initial stages of being offered to customers and interest in the item 136 has not matured. Alternatively, there may be other reasons why the number of referrals falls below a predefined minimum threshold.

Given that the number of referrals falls below a given minimum threshold, then it is assumed that the marketing cost represented by such referrals is also minimal, thereby justifying placement of the respective item 136 into the feed 139 as little cost is incurred. However, if the marketing cost due to referrals increases such that it is unwarranted relative to the number of sales of a given item 136, then a closer look may be deemed necessary as will be described. In box 256, as mentioned above, the feed content control process 131*b* includes the item 136 in the feed 139. Thereafter, the feed content control process 131*b* ends with respect to the item 136 under consideration.

Assuming that the minimum number of referrals has occurred over the last predefined period of time as determined in box 253, then the feed content control process 131*b* proceeds to box 258 as shown. In box 258, if a predefined maximum number of referrals have occurred over the last predefined period of time, then the feed content control process 131*b* proceeds to box 259. Otherwise, the feed content control process 131*b* skips to box 263. The maximum number of referrals specified may be, for example, 100 referrals or some other number to limit marketing expenditure for items 136 having large profit margins and for other reasons.

In box 259, it is determined whether the marketing cost due to the referrals that occurred over the last period of time is less than the profit associated with the sale of one unit of the item 136 considered. The profit may be determined for a respective item 136 by viewing accounting data maintained for such item 136 as can be appreciated. Assuming that the marketing cost with respect to referrals for a specific item 136 is less than the profit that is obtained by the sale of one of such items 136, then the feed content control process 131*b* proceeds to box 256 in order to include the item in the feed 139. Thus, the item 136 is included in the feed 139 if the cost for the referrals received from the referral network site 143 is less than the profit that would be realized by the sale of one item 136.

On the other hand, if the cost of referrals is greater than the profit from the sale of one item 136, then the feed content control process 131*b* proceeds to box 263 to calculate the marketing expenses presented by the referrals over the prior period of time as a percent of total item sales revenue for a given item 136. This serves to act as a limit upon the marketing expenditure for a given item 136 through referrals from referral network sites 143. The total item sales revenue is a figure that equals the total amount received due to sales of a given item 136 over the past predefined period of time.

For example, assume that a quantity of ten of a given item 136 has been sold over the last prior period of time as described above. Also assume that the unit price for the item 136 is $1,000. Further assume that there have been 5,667 referrals for such item 136 from a respective referral network site 143 over the same period of time. Further assume that the referral network site 143 is to be paid 15 cents for each referral received by the merchant operating the electronic commerce system 123 (FIG. 1). As such, then the total marketing expense due to the referrals is $850.05. Since ten of the items 136 have been sold at a price of $1,000 each, then the total item sales revenue is equal to $10,000. Thus, to calculate the marketing expense due to the referrals as a percent of the item sales revenue, one may divide $850.05 by $10,000 to obtain a percentage of approximately 8.5.

Once the marketing expense due to the referrals is calculated as a percent of the item sales revenue as described above, then the feed content control process 131*b* proceeds to box 266 to determine whether the percentage calculated is less than a predefined threshold for the respective item 136. For example, the threshold may be specified as 5%, 7%, or some other percentage. There may be several different percentage thresholds specified for various different items 136 due to the differing prices of such items 136. For example, for some items 136 having a higher profit margin, a greater percentage threshold may be specified. For other items 136 having a relatively lower profit margin, a lower threshold may be warranted. In the end, the percentage threshold specified for a respective item 136 is application specific. Note that different thresholds may be specified for different items 136 or categories of items 136 as can be appreciated.

Assuming that the percentage calculated in box 263 is less than a given threshold, then the feed content control process 131*b* proceeds to box 256 to include the respective item 136 in the feed 139. Otherwise, the feed content control process 131*b* proceeds to box 269 and excludes such item 136 from the feed 139. Thus, if an item 136 excluded in box 269, then it has effectively passed through three different exclusion rules or tests as specified in boxes 253, 259, and 266. Stated another way, the exclusion process described involves the application of exclusion rules to the respective item 136. It should be understood that other rules may be included in the process described above in determining whether a given item 136 is to be included in a given feed 139. Assuming that an item 136 is included in box 256 or excluded in box 269, the feed content control process 131*b* ends this portion with respect to the item 136 considered as shown.

In addition, it should be understood that both of the feed content control processes 131*a* and 131*b* described above may be employed together or individually to determine which items 136 are to be included in a given feed 139. For example, in one embodiment, the feed content control process 131*a* may first be used to determine which items 136 are to be included in, or excluded from, a feed 139. Thereafter, those items 136 that are to be included in the feed 139 may be further applied to the feed content control process 131*b*. Alternatively, items 136 may first be applied to the feed content control process 131*b*, and then to the feed content control process 131*a*. Ultimately, items 136 are included in a feed 139 if they survive both feed content control processes 131*a* and 131*b*. Alternatively, only one of the feed content control processes 131*a* or 131*b* may be used to determine whether items 136 are to be included in a given feed 139.

Figure 5:
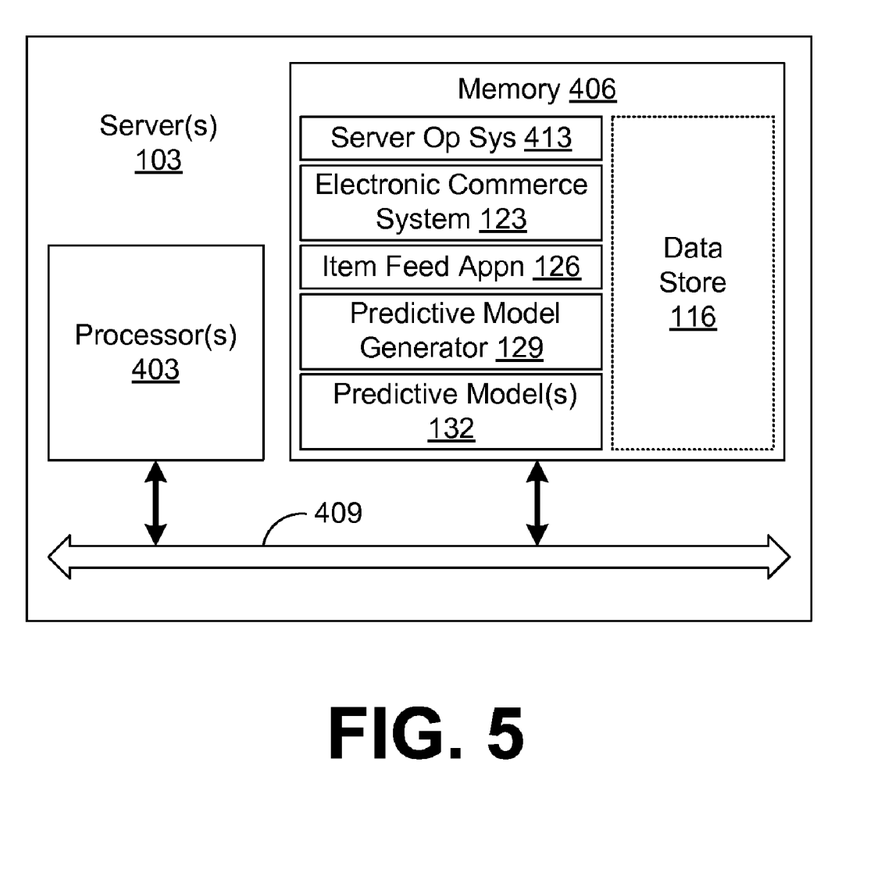
FIG. 5 is a schematic block diagram of one example of one of the servers in the networked environment of FIG. 1 according to an embodiment of the present disclosure.

Referring next to FIG. 5, shown is a schematic block diagram of one example of a server 103 according to an embodiment of the present disclosure. The server 103 includes at least one processor circuit, for example, having a processor 403 and a memory 406, both of which are coupled to a local interface 409. The processor 403 is a solid state device that includes millions of switching elements such as transistors and other elements. The server 103 may comprise, for example, a server computer system or like device as described above. The local interface 409 may comprise, for example, a data bus with an accompanying address/control bus or other bus structure as can be appreciated.

Stored in the memory 406 are both executable applications and/or systems executed by the processor 403 and data. In particular, stored in the memory 406 and executable by the processor 403 are a server operating system 413, the electronic commerce system 123, the item feed application 126 (including the feed content control process 131 (FIG. 1)), the predictive model generator 129, the predictive models 132, and potentially other applications and/or systems, etc. Also, stored in the memory 406 is the data store 116 in which are stored the various data items described above so as to be accessible to the processor 403. It is understood that other data may be stored in the memory 406 and accessed by the processors 403 beyond the data described above.

A number of software components are stored in the memory 406 and are executable or executed by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 403 may represent multiple processors and the memory 406 may represent multiple memories that operate in parallel. In such a case, the local interface 409 may be an appropriate network that facilitates communication between any two of the multiple processors, between any processor and any one of the memories, or between any two of the memories etc. The local interface 409 may comprise additional systems designed to coordinate this communication, including, for example, performing load balancing. The processor 403 may be of electrical or of some other available construction.

The various systems, applications, or other components described above may be implemented using any one or more of a number of programming languages such as, for example, C, C++, C#, Visual Basic, VBScript, Java, JavaScript, Perl, Ruby, Python, Flash, or other programming languages.

Although the various applications and other components such as, for example, the electronic commerce system 123, the item feed application 126 (including the feed content control process 131), the predictive model generator 129, the predictive model 132, and any other components described above may be embodied in software or code executed by general purpose hardware, as an alternative each may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3-4 show the functionality and operation of an implementation of the various applications and/or other components such as, for example, the feed content control processes 131a and 131b as a portion of the item feed application 126 as described above. If embodied in software, each of the various blocks described may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts of FIGS. 3-4 show a specific order of execution, it is understood that the order of execution may differ from that which is depicted. For example, the order of execution of two or more blocks may be scrambled relative to the order shown. Also, two or more blocks shown in succession in FIGS. 3-4 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the various applications, systems, and/or other components described herein such as, for example, the electronic commerce system 123, the item feed application 126 (including the feed content control process 131), the predictive model generator 129, and the predictive model 132 comprise software or code, each can be embodied in any computer-readable medium for use by or in connection with an instruction execution system such as, for example, a processor in a computer system or other system. In this sense, the applications or engines may comprise, for example, statements including instructions and declarations that can be fetched from the computer-readable medium and executed by the instruction execution system. In the context of the present disclosure, a "computer-readable medium" can be any medium that can contain, store, or maintain logic or code for use by or in connection with the instruction execution system. The computer readable medium can comprise any one of many physical media such as, for example, electronic, magnetic, optical, semiconductor, or other media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer readable medium embodying a program executable by at least one computing device, comprising:
an item feed application configured to periodically send a feed of a subset of a plurality of items to a comparison shopping network site over a network, the items being sold to a plurality of customers through an electronic commerce network site over a network, wherein at least a portion of a plurality of sales of the items through the electronic commerce network site originate by virtue of a referral from the comparison shopping network site;
a portion of the item feed application including:
code that stores a quantity of commercial data associated with the items in a data store, the commercial data including sales history data associated with the items;
code that trains a predictive model in the computing device with the commercial data associated with the items;
code that applies each of the items to the predictive model to determine whether such items are to be included in a feed to the referral network site; and
code that sends the feed that includes a subset of the items to the referral network site.

2. The non-transitory computer readable medium embodying the program executable by the at least one computing device of claim 1, wherein the predictive model comprises a random forest model.

3. A method, comprising the steps of:
maintaining a catalog of a plurality of items sold through an electronic commerce network site implemented in a computing device, wherein at least a portion of a plurality of sales of the items originate by virtue of a referral from a referral network site;
storing a quantity of commercial data associated with the items in a data store;
training a predictive model in the computing device with the commercial data associated with the items;
applying each of the items to the predictive model to determine whether such items are to be included in a feed to the referral network site; and
sending the feed that includes a subset of the items to the referral network site.

4. The method of claim 3, wherein the steps of training and applying are performed automatically.

5. The method of claim 3, wherein the step of training the predictive model in the computing device with the commercial data associated with the items further comprises the step of training the predictive model with a quantity of predefined events occurring in a plurality of different past time periods.

6. The method of claim 3, wherein the predictive model comprises a random forest model.

7. The method of claim 5, further comprising the step of tracking a number of selections of an item detail page for each of the items by customers during interaction with the electronic commerce network site, wherein the events further comprise the selections.

8. The method of claim 7, wherein at least some of the selections occur by virtue of the referral from the referral network site.

9. The method of claim 5, further comprising the step of tracking the sales of each of the items through the electronic commerce network site, wherein the events further comprise the sales of the items.

10. The method of claim 3, further comprising the step of maintaining a taxonomy in the computing device, the taxonomy including a plurality of item categories, wherein the commercial data further includes an association between respective ones of the item categories and respective ones of the items.

11. The method of claim 3, wherein the items are associated with a product segment.

12. The method of claim 11, wherein the items associated with the product segment include features in common with each other.

13. The method of claim 3, wherein the referral network site operates on a cost-per-click basis with respect to the electronic commerce network site.

14. The method of claim 3, wherein the referral network site operates on a cost-per-action basis with respect to the electronic commerce network site.

15. A system, comprising:
at least one processor based device having a processor and a memory;
a catalog of a plurality of items stored in the memory, the items being sold through an electronic commerce network site, wherein at least a portion of a plurality of sales of the items originate by virtue of a referral from a referral network site;
commercial data associated with each the items stored in the memory; and
a feed content control process stored in the memory and executable by the processor, the feed content control process comprising:
logic that trains a predictive model with the commercial data associated with a subset of the items;
logic that applies each of the items in the subset to the predictive model to determine whether such items are to be included in a feed to the referral network site; and
logic that generates and sends the feed to the referral network site.

16. The system of claim 15, wherein the predictive model comprises a random forest model.

17. The system of claim 15, wherein the predictive model comprises a classification model.

18. The system of claim 15, wherein the subset of items are associated with a product segment.

19. The system of claim 18, wherein the items associated with the product segment include at least one similar feature.

20. The system of claim 15, wherein the logic that generates and sends the feed to the referral network site is implemented periodically.

21. The system of claim 20, wherein the logic that trains the predictive model with the commercial data associated with the subset of the items and the logic that applies each of the items in the subset to the predictive model to determine whether such items are to be included in the feed to the referral network site are both implemented before the generation and sending of a feed.

22. The system of claim 15, wherein the logic that trains the predictive model with the commercial data associated with the subset of the items further comprises logic that trains a plurality of predictive models, where each predictive model is trained using the commercial data associated with a corresponding one of a plurality of subsets of the items.

23. The system of claim 22, wherein the items associated with each of the subsets are associated with a product segment defined among all of the items in the catalog.

24. The system of claim 15, further comprising a taxonomy maintained in the memory, the taxonomy including a plurality of item categories, wherein the commercial data further includes a plurality of associations between respective ones of the item categories and respective ones of the items.

25. The system of claim 15, wherein the commercial data includes a plurality of predefined events associated with respective ones of the items occurring within a plurality of predefined past time periods.

26. The system of claim 25, wherein the predefined events further comprise a plurality of selections of item detail pages made by customers during interaction with the electronic commerce network site, wherein each item detail page includes information about a respective one of the items.

27. The system of claim 26, wherein at least some of the selections occur by virtue of the referral from the referral network site.

* * * * *